US005820099A

United States Patent [19]

Rahbar et al.

[11] Patent Number: 5,820,099

[45] Date of Patent: Oct. 13, 1998

[54] FLUID MIGRATION INHIBITOR FOR FUEL INJECTORS

[75] Inventors: Mehran K. Rahbar, El Paso, Tex.; Johnny Leung, Newport News, Va.

[73] Assignee: Siemens Automotive Corporation, Auburn Hills, Mich.

[21] Appl. No.: 859,408

[22] Filed: May 20, 1997

[51] Int. Cl.[6] .................... F16K 31/06

[52] U.S. Cl. .................... 251/129.15; 251/129.21; 239/585.4; 335/260

[58] Field of Search .................... 251/129.15, 129.21; 239/585.1, 585.4; 335/260, 278

[56] References Cited

U.S. PATENT DOCUMENTS

| | | | |
|---|---|---|---|
| 3,567,135 | 3/1971 | Gebert | 239/585.1 |
| 3,669,361 | 6/1972 | Guéret | 239/585.1 |
| 3,887,162 | 6/1975 | Antoni et al. . | |
| 4,373,671 | 2/1983 | Giardini | 239/585.5 X |
| 4,944,486 | 7/1990 | Babitzka | 251/129.21 |
| 5,217,036 | 6/1993 | Maier | 251/129.15 X |
| 5,348,232 | 9/1994 | Babitzka et al. | 251/129.21 X |
| 5,357,933 | 10/1994 | Kasahara et al. . | |
| 5,465,910 | 11/1995 | Hall et al. . | |
| 5,465,911 | 11/1995 | Hall . | |
| 5,494,225 | 2/1996 | Nally et al. . | |

*Primary Examiner*—Kevin Lee

[57] ABSTRACT

A fuel injector has a metal housing with grooves formed adjacent the interface of the metal housing and a plastic overmold. By extending the overmold around the grooves, fluid migration past the interface of the overmold and metal housing is prevented. Fluid migration is also prevented in the calibration hole of the injector by forming a thin layer of plastic material at the base of the hole which, when compressed during staking and calibration, remains as a layer overlying the metal portions of the inlet connector. The terminal boss for the windings of the injector also has a plurality of grooves which during the plastic encapsulation process, are filled with plastic materials, hence also inhibiting fluid migration past the interface.

13 Claims, 4 Drawing Sheets

FIG. 1
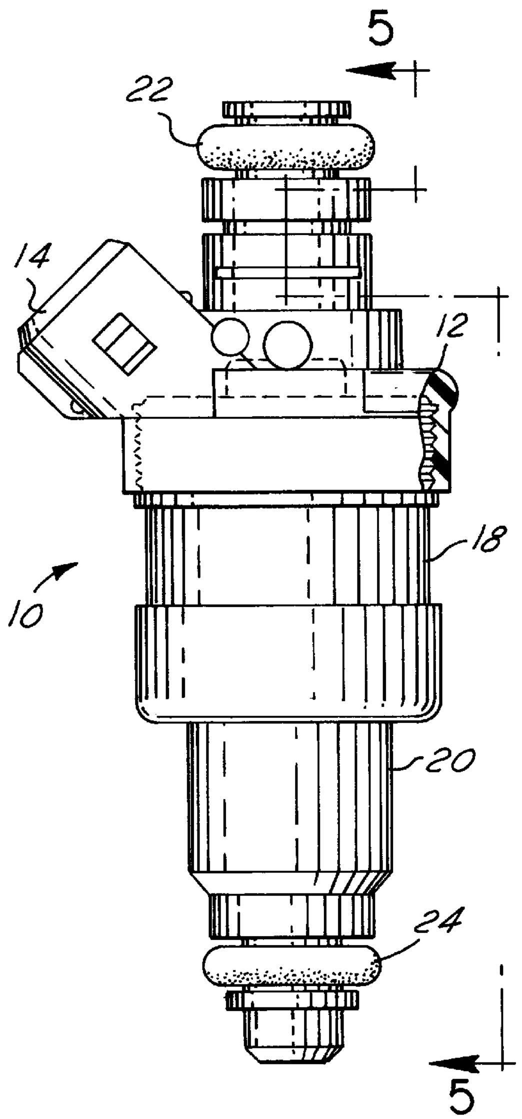
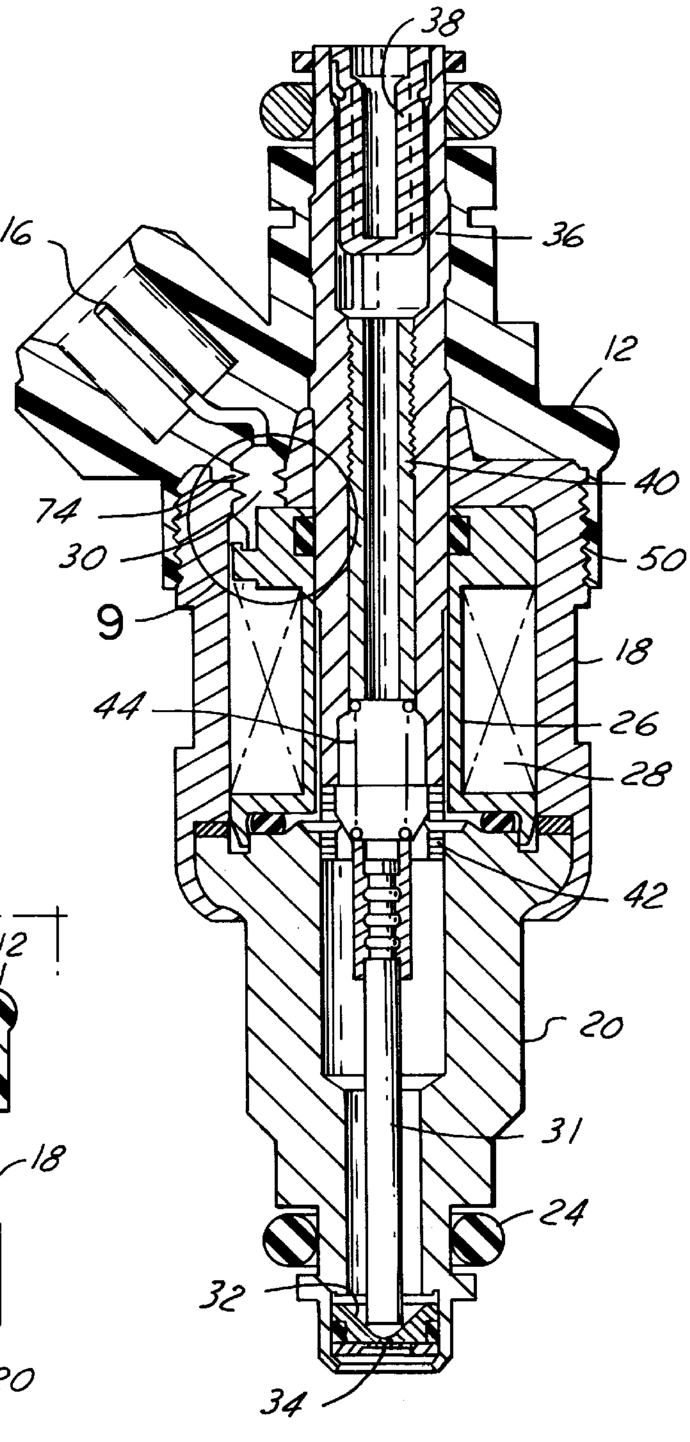
FIG. 1A

FLUID MIGRATION INHIBITOR FOR FUEL INJECTORS

TECHNICAL FIELD

The present invention relates generally to fuel injectors and particularly to fuel injectors formed of dissimilar materials, i.e., metallic and non-metallic, wherein fluid migration between the joined dissimilar materials is minimized or eliminated.

BACKGROUND

Currently manufactured fuel injectors typically comprise a housing encompassing an internal coil assembly which has external electrical leads for connection to an electrical source for pulsing the coil and causing fuel to periodically flow through the injector into a combustion cylinder. These fuel injectors are typically formed of dissimilar materials, i.e., plastic materials for encapsulating the metal housing and coil assembly, as well as the external electrical connection. During active service life of the fuel injector, it must perform within a harsh environment, where it is exposed to a wide range of thermal cycles and thermal shock in the presence of fluid, e.g., water and other types of fluid materials. During thermal cycles and thermal shock, dissimilar materials expand and contract at different rates. This frequently causes an air gap to be created at the interface of the dissimilar materials. Additionally, a negative differential pressure exists within the internal and external portions of the fuel injector whereby external fluid can migrate into the working components of the fuel injector and damage the electrical connection or other internal components, for example, by corrosion. Consequently, there is a significant problem extant in fuel injectors formed of dissimilar materials wherein fluid migration may occur in gaps between the interfaces of the materials caused by thermal cycles and shocks and continuous use.

More particularly, the conventional fuel injector housing is formed of metal and encapsulates the bobbin containing the windings. A plastic overmold is typically provided about the fuel inlet connector at one end of the housing. Thus, the interface between the plastic overmold and the housing can form a gap during use permitting migration of fluid. Additionally, the bobbin carries terminal bosses through which the electrical lead to the external electrical signal source is extended. The terminal bosses lie adjacent the interface of the plastic overmold and the metal housing and thus can be a source of gaps enabling fluid migration. Still further, a calibration hole is typically provided through the plastic overmold for calibrating the fuel injector. The plastic overmold overlies the inlet connector and an internal adjusting tube. The adjusting tube is adjusted axially during calibration into a predetermined axial position relative to the inlet connector and staked in that position. The staking process requires a pin to be driven laterally into the inlet connector to deform the material of the connector and adjusting tube, hence fixing the position of the adjusting tube in the inlet connector. The calibration hole through the plastic overmold typically exposes the metal of the inlet connector to various fluids and affords an additional area of potential fluid migration.

DISCLOSURE OF THE INVENTION

In accordance with the present invention, the plastic overmold and metal parts are configured in a unique manner to inhibit or eliminate entirely fluid migration between such dissimilar parts, i.e., the plastic overmold and the metal portions of the housing and bobbin, as well as the overmold and the inlet connector. To prevent fluid migration between the overmold and the housing, a plurality of grooves are formed along the outside of the housing adjacent the juncture of the overmold and the housing. The plastic overmold material is extended into these grooves during the molding process. The grooves are thus completely filled with the plastic material. By forming the grooves and filling them with plastic material, a tortuous path is provided between the plastic overmold in the grooves and the housing which minimizes or eliminates fluid intrusion. The grooves also increase the strength of the joined surfaces. The grooves may be continuous cylindrical or spiral screwthread-type grooves.

Further, the terminal bosses for the bobbin extend through openings in the housing. The terminal bosses, in accordance with the present invention, are provided with grooves. Sufficient clearance is provided between the outer surfaces of the terminal bosses and the internal walls of the openings of the housing such that plastic material may migrate during the plastic encapsulation process into the grooves and hence provide an additional tortuous path inhibiting fluid migration.

Further, in the region of the calibration hole, the plastic overmold has a thin layer of plastic material at the base of the calibration hole overlying a side wall portion of the inlet connector. When the staking pin is driven through the hole to deform the metal of the inlet connector and hence fix the adjusting tube in axially adjusted position, the thin layer of plastic material at the base of the hole is compressed but does not rupture. Thus, a continuous layer of overmold plastic material overlies the metal side wall portion of the inlet connector in the region of the calibration hole even after staking to prevent fluid migration and which metal side wall portion would otherwise have been exposed after staking.

In a preferred embodiment according to the present invention, there is provided a fuel injector for an engine comprising a housing formed of a metal material, a coil assembly within the housing and having an electrical lead for externally coupling the injector to a signal source and plastic material about the housing and the electrical lead, the housing having a plurality of grooves about an outside surface thereof and overlaid with the plastic material affording a tortuous path to minimize fluid intrusion into the fuel injector.

In a further preferred embodiment according to the present invention, there is provided a fuel injector for an engine comprising a housing formed of a metal material and having an opening at one end, a bobbin within the housing, a coil assembly within the bobbin, windings about the bobbin and an electrical lead for coupling the windings to an external signal source, the bobbin including a terminal boss projecting therefrom and through the housing opening, the terminal boss having at least one groove about an outside surface thereof in registration with the metal housing material about the opening and overlaid with plastic material for minimizing fluid intrusion into the windings of the bobbin.

In a still further preferred embodiment according to the present invention, there is provided a fuel injector for an engine comprising a housing, a bobbin within the housing and windings about the bobbin, an inlet connector within the housing and projecting therefrom, an armature in the housing and a needle coupled thereto, a seat about an orifice at one end of the injector, the needle being selectively movable relative to the seat in response to energization of the windings to enable fuel flow through the orifice, an adjusting tube coaxially within the inlet connector, a spring between one end of the adjusting tube and the armature for adjusting the flow of fuel through the orifice, an overmold formed of plastic material overlying at least a portion of the inlet connector remote from one end of said injector, a calibration hole in the overmold including a thin layer of plastic overmold material at a base of the calibration hole overlying the inlet connector portion wherein, upon calibration and staking of the inlet connector and the adjusting tube one to the other by a staking pin impacting the base of the calibration hole, a continuous layer of plastic material remains in the calibration hole base without externally exposing an inlet connector portion.

Accordingly, it is a primary object of the present invention to provide a fuel injector for an internal combustion engine having a plastic overmold specifically configured to minimize or prevent fluid migration between plastic and metal parts of the injector.

BRIEF DESCRIPTION OF THE DRAWINGS

FIG. 1 is a side elevational view with portions broken out and in cross-section illustrating a fuel injector constructed in accordance with the present invention;

FIG. 1A is a longitudinal cross-sectional view through the fuel injector of FIG. 1;

BEST MODE FOR CARRYING OUT THE INVENTION

Figure 2:
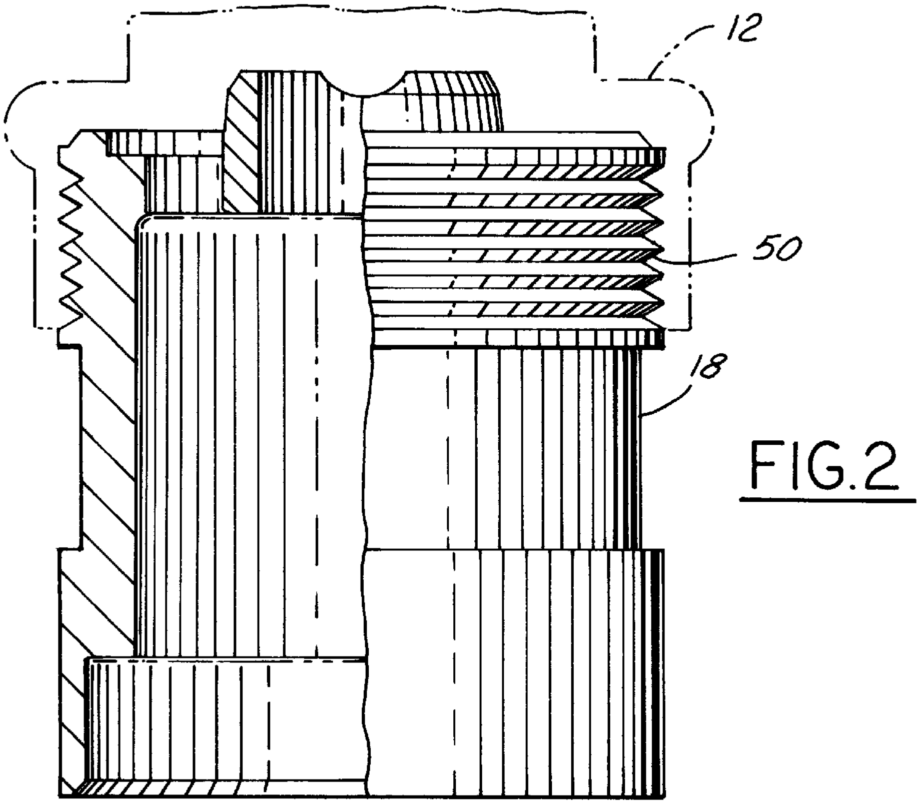
FIG. 2 is an enlarged side elevational view with portions broken out and in cross-section of the housing portion of the fuel injector of FIG. 1.

Referring now to FIG. 1, there is illustrated a fuel injector, generally designated 10, constructed in accordance with the present invention and generally comprising an upper plastic overmold 12, a lateral electrical socket 14 housing an electrical terminal 16 (FIG. 1A), a central external housing 18 and a lower body 20. O-rings 22 and 24 are provided at upper and lower ends of the fuel injector for sealing the fuel injector to the fuel rail and intake manifold, respectively. Referring to FIG. 1A, the housing 18 encompasses a bobbin 26 having windings 28 thereabout, coupled through terminal bosses 30 to the electrical leads 16. The lower end of housing 18 is crimped about the upper end of body 20. The bobbin 26, overmold 12 and body 20 have aligned axial passages to receive mechanical parts of the injector for displacing the needle 31 from the valve seat 32 about valve orifice 34 at the lower end of the injector.

More particularly, within the overmold 12 and bobbin 26, there is provided an inlet connector 36 in the form of a hollow sleeve having a fuel filter 38 at its upper end and an axially movable adjusting tube 40. Between the lower end of adjusting tube 40 and an armature 42, there is provided a spring 44 for biasing the needle 31 into a valve-closed or sealed position against valve seat 32. It will be appreciated that the pulsing of windings 28 causes the armature 42 to open the valve orifice 34 with the spring 44 returning the needle 31 to its valve-closed position. In previous fuel injectors, the plastic overmold 12 extended about the upper annular face of the housing 18 forming an interface between the metal of housing 18 and the plastic material of the overmold 12. Due to thermal cycles and shock, there remained the possibility of fluid migration along the interface upon expansion and contraction of these two dissimilar materials at different rates.

Figure 3:
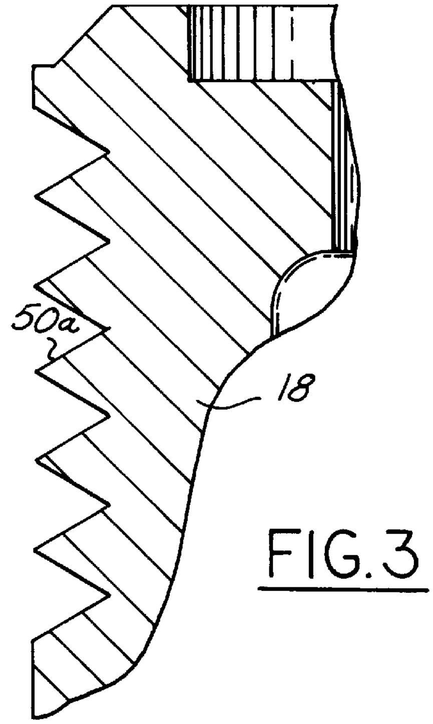
FIGS. 3 and 4 are fragmentary enlarged cross-sectional views of grooves formed along the side of the housing of FIG. 2.
Figure 4:
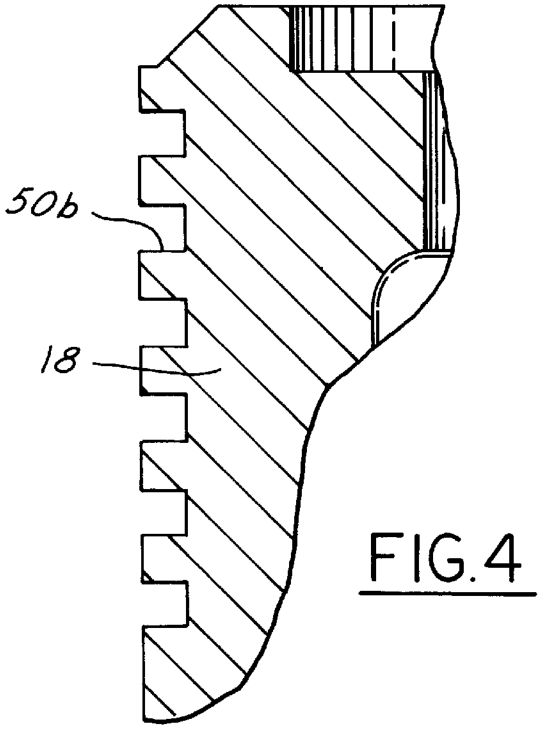

In accordance with the present invention, fluid migration along the interface of the two dissimilar materials is minimized or eliminated. Particularly, the outer surface of housing 18 adjacent the interface of the housing with the plastic overmold 12 is provided as illustrated in FIG. 2 with a series of grooves 50. Grooves 50 may be cylindrical or spiral as in a thread. In FIG. 2, the plastic overmold 12 is illustrated as having been extended in accordance with the present invention about the grooves 50. As illustrated in FIGS. 3 and 4, the grooves 50 may be provided in tapered form as grooves 50*a* or as rectilinear grooves 50*b* in either spiral or cylindrical form, respectively. Consequently, with the plastic overmold extended down and about the grooves 50 of the housing 18, any gap formed between the dissimilar materials of the overmold 12 and the metal housing 18 still requires a highly tortuous path to afford fluid migration between internal and external portions of the fuel injector. The provision of grooves along the outside of the metal housing 18 also strengthens the fuel injector from a structural standpoint.

Figure 6:
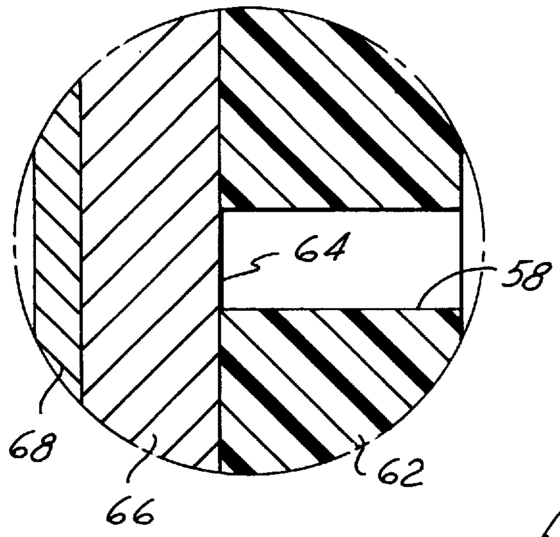
(PRIOR ART) FIG.6
FIG. 6 is an enlarged cross-sectional view of a prior art fuel injector calibration hole.

Referring now to FIG. 6, there is illustrated a calibration hole 58 formed through a plastic overmold of a prior art fuel injector. It will be appreciated that the calibration hole 58 is a cylindrical hole formed wholly through the plastic overmold 62, exposing a side wall portion 64 of a metal inlet connector 66. Typically, a staking pin, not shown, would be driven through the calibration hole 58 to deform the metal of the inlet connector 66 and stake the connector 66 to the adjusting tube 68. Upon withdrawal of the staking pin, it will be appreciated that the metal of the inlet connector 66 remained exposed to the ambient conditions. That exposure increased the potential for the formation of a gap at the interface of the overmold 62 and the metal outer surface of inlet connector 66.

Figure 5:
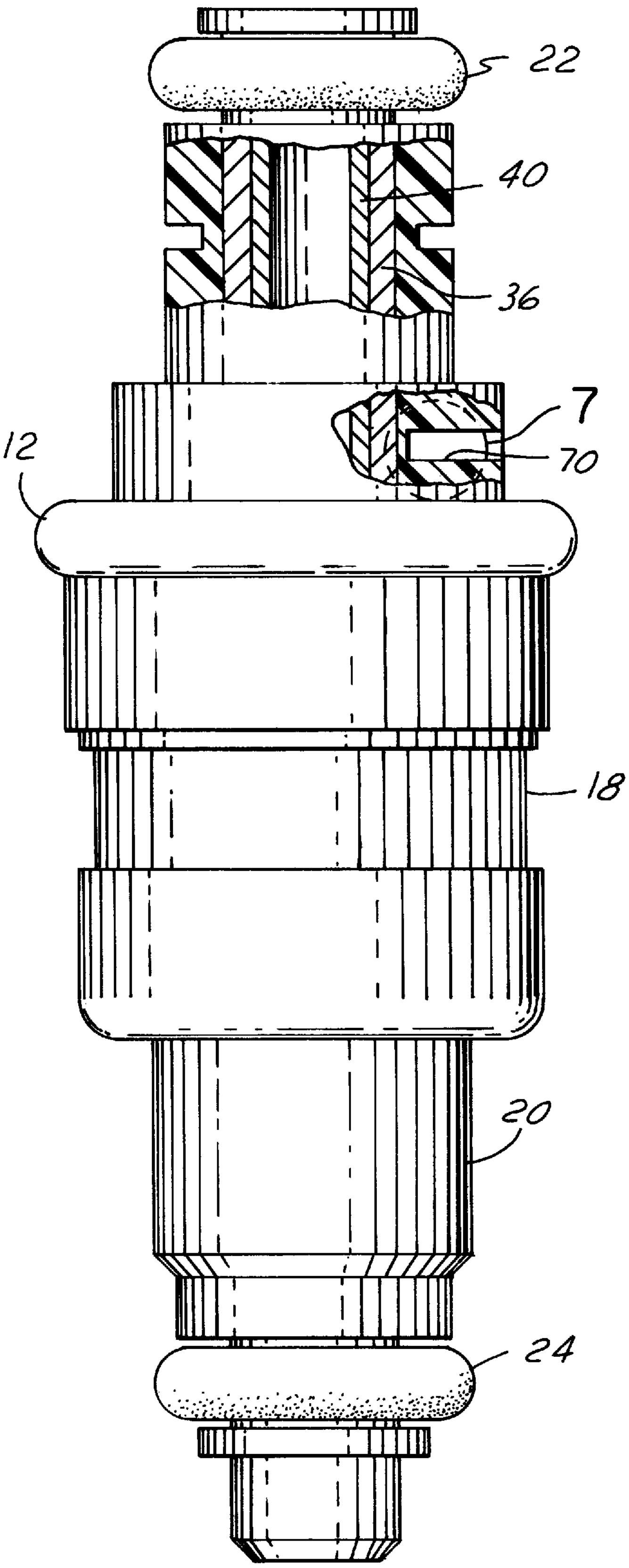
FIG. 5 is a cross-sectional view taken about line 5—5 in FIG. 1 illustrating the upper end of the fuel injector with the calibration hole.
Figure 7:
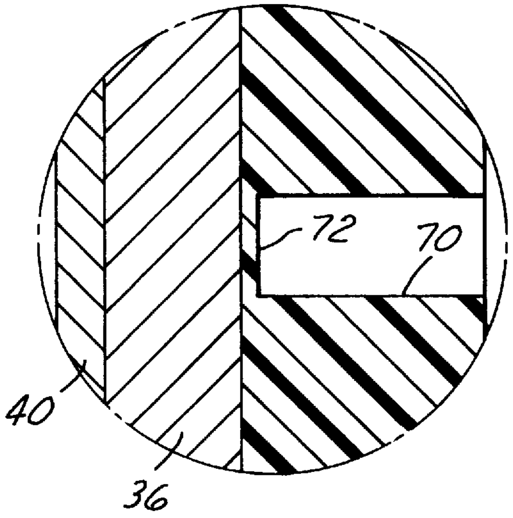
FIGS. 7 and 8 are enlarged fragmentary cross-sectional views illustrating a calibration hole before and after staking, respectively, in accordance with the present invention and taken in the circled region indicated 7 in FIG. 5.
Figure 8:
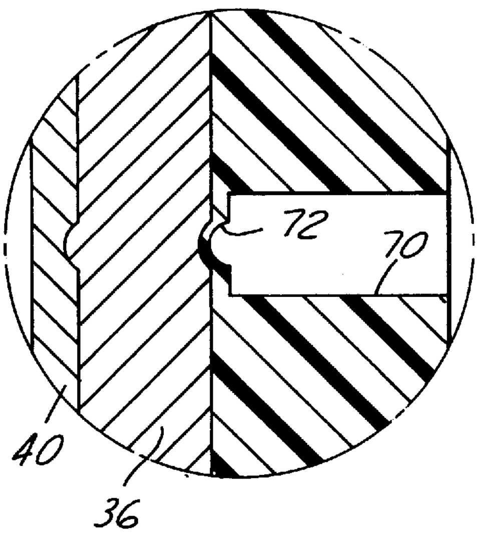

In accordance with the present invention, as illustrated in FIGS. 5, 7 and 8, the plastic overmold 12 is formed with a calibration hole 70 similarly as in the prior art. However, the base of the calibration hole 70 is provided with a thin layer of plastic material 72 which overlays the side wall portion of the inlet connector 36. Hence, prior to staking, none of the metal surfaces of the inlet connector in the region of the calibration hole 70 are exposed. In FIG. 8, the plastic overmold 12, inlet connector 36 and adjusting tube 40 are illustrated after staking. It will be appreciated that the staking pin, not shown, has deformed the thin plastic layer 72, inlet connector 36 and the adjusting tube 40. However, while the thin layer of plastic material 72 has been deformed, it remains as a layer overlying the metal surface of the side wall portion of the inlet connector 36. Thus, after staking, a continuous protective layer of overmold plastic material 12 overlies the metal surface of the inlet connector 36 in the region of the calibration hole. Consequently, fluid migration in that region is inhibited or prevented.

Figure 9:
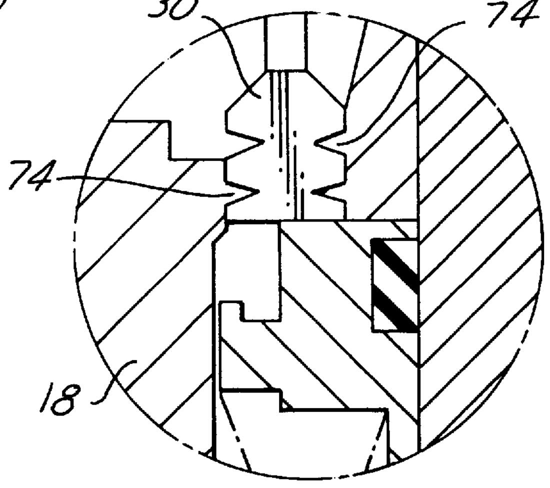
FIG. 9 is an enlarged fragmentary cross-sectional view illustrating the plastic encapsulation about the grooves of the terminal bosses and taken in the circled region indicated 9 in FIG. 1A.

Referring to FIG. 9, the terminal boss 30 which extends through openings in the housing 18 is formed with a plurality of axially spaced grooves 74. The outer surfaces of the terminal bosses have clearances with the inner walls of the openings in the housing 18. During the overmolding plastic encapsulation process, the plastic material migrates into that clearance and into the grooves 74 of the terminal bosses 30. Consequently, once again, a tortuous path is provided between dissimilar materials which inhibits or prevents fluid migration past the interface of the materials.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel injector for an engine comprising:

a housing formed of a metal material;

a coil assembly internally within said housing and having an electrical lead for externally coupling said injector to a signal source; and plastic material about said housing and said electrical lead;

said housing having a plurality of grooves about an outside surface thereof and overlaid with said plastic material, said plastic material being molded about said grooves thereby affording a tortuous path to minimize fluid intrusion into the fuel injector.

2. A fuel injector according to claim 1 wherein said grooves are cylindrical about said housing.

3. A fuel injector according to claim 1 wherein said grooves are formed in a spiral about said housing.

4. A fuel injector according to claim 1 wherein said grooves are V-shaped in cross-section.

5. A fuel injector according to claim 1 wherein said grooves are rectilinear-shaped in cross-section.

6. A fuel injector according to claim 1 wherein said coil assembly includes a bobbin and windings about said bobbin electrically coupled to said lead, a terminal boss carried by said bobbin and projecting therefrom, said housing having an opening at one end thereof, said terminal boss extending through said opening and having at least one groove about an outside surface thereof and overlaid with said plastic material, said plastic material being molded about said one groove thereby minimizing fluid intrusion into said windings of said bobbin.

7. A fuel injector for an engine comprising:

a housing formed of a metal material and having an opening at one end;

a bobbin within said housing;

a coil assembly within said bobbin, windings about said bobbin and an electrical lead for coupling said windings to an external signal source;

said bobbin including a terminal boss projecting therefrom and through said housing opening, said terminal boss having at least one groove about an outside surface thereof in registration with said metal housing material about said opening and overlaid with plastic material, said plastic material being molded about said one groove thereby minimizing fluid intrusion into said windings of said bobbin.

8. A fuel injector according to claim 7 wherein said groove is V-shaped in cross-section.

9. A fuel injector for an engine comprising:

a housing;

a bobbin within said housing and windings about said bobbin;

an inlet connector within said housing and projecting therefrom;

an armature in said housing and a needle coupled thereto, a seat about an orifice at one end of said injector, said needle being selectively movable relative to said seat in response to energization of said windings to enable fuel flow through said orifice;

an adjusting tube coaxially within said inlet connector;

a spring between one end of said adjusting tube and said armature for adjusting the flow of fuel through said orifice;

an overmold formed of plastic material overlying at least a portion of said inlet connector remote from said one end of said injector;

a calibration hole in said overmold including a thin layer of plastic overmold material at a base of said calibration hole overlying said inlet connector portion wherein, upon calibration and staking of said inlet connector and said adjusting tube one to the other by a staking pin impacting the base of said calibration hole, a continuous layer of plastic material remains in said calibration hole base without externally exposing an inlet connector portion.

10. A fuel injector according to claim 9 wherein said inlet connector portion adjacent the base of the calibration hole has a radially inwardly directed deformation extending into said adjusting tube after staking to maintain said adjusting tube in a predetermined axial position within said inlet connector.

11. A fuel injector according to claim 9 wherein said housing has a plurality of grooves about an outside surface thereof overlaid with said overmold plastic material affording a tortuous path to minimize fluid intrusion into the fuel injector.

12. A fuel injector according to claim 9 wherein said windings are coupled to an electrical lead external of said overmold, a terminal boss carried by said bobbin and projecting therefrom, said housing having an opening at one end thereof, said terminal boss extending through said opening and having at least one groove about an outside surface thereof for minimizing fluid intrusion into said windings of said bobbin.

13. A fuel injector according to claim 11 wherein said plastic material is molded about said plurality of grooves.

* * * * *